United States Patent [19]
Grube et al.

[11] Patent Number: 5,509,075
[45] Date of Patent: Apr. 16, 1996

[54] METHOD OF DETECTING UNAUTHORIZED USE OF A COMMUNICATION UNIT IN A SECURE COMMUNICATION SYSTEM

[76] Inventors: Gary W. Grube, 157 Cedarwood Ct., Palatine, Ill. 60067; Timothy W. Markison, 555 Northview La., Hoffman Estates, Ill. 60194; Susan L. Lukasik, 415 S. Westmore, Lombard, Ill. 60148

[21] Appl. No.: 230,993

[22] Filed: Apr. 21, 1994

[51] Int. Cl.$^6$ .................................................. H04L 9/32
[52] U.S. Cl. ......................... 380/23; 380/49; 327/525; 340/825.31; 340/825.34
[58] Field of Search .................... 380/4, 23, 25, 380/49, 50, 2, 3; 307/202.1; 327/525; 340/825.31, 825.34

[56] References Cited

U.S. PATENT DOCUMENTS

| | | | |
|---|---|---|---|
| 4,218,738 | 8/1980 | Matyas et al. | 380/25 |
| 4,672,572 | 6/1987 | Alsberg | 380/23 |
| 4,679,236 | 7/1987 | Davies | 380/23 |
| 4,799,258 | 1/1989 | Davies | 380/23 X |
| 4,956,769 | 9/1990 | Smith | 380/25 X |
| 5,014,234 | 5/1991 | Edwards, Jr. | 380/4 X |
| 5,018,096 | 5/1991 | Aoyama | 380/25 X |
| 5,048,085 | 9/1991 | Abraham et al. | 380/23 |

*Primary Examiner*—Bernarr E. Gregory
*Attorney, Agent, or Firm*—Susan L. Lukasik

[57] ABSTRACT

A method for detecting unauthorized use of a communication unit in a secure wireless communication system includes receiving, by a central controller, a service request from the communication unit via the wireless communication system. The central controller determines whether the service request is requesting an unencrypted communication resource or an encrypted communication resource. When the service request is requesting an unencrypted communication resource, the central controller determines whether the service request substantially matches a historical utilization pattern. When the service request does not substantially match the historical utilization pattern, the central controller indicates that the communication unit is a potential unauthorized communication unit.

17 Claims, 2 Drawing Sheets

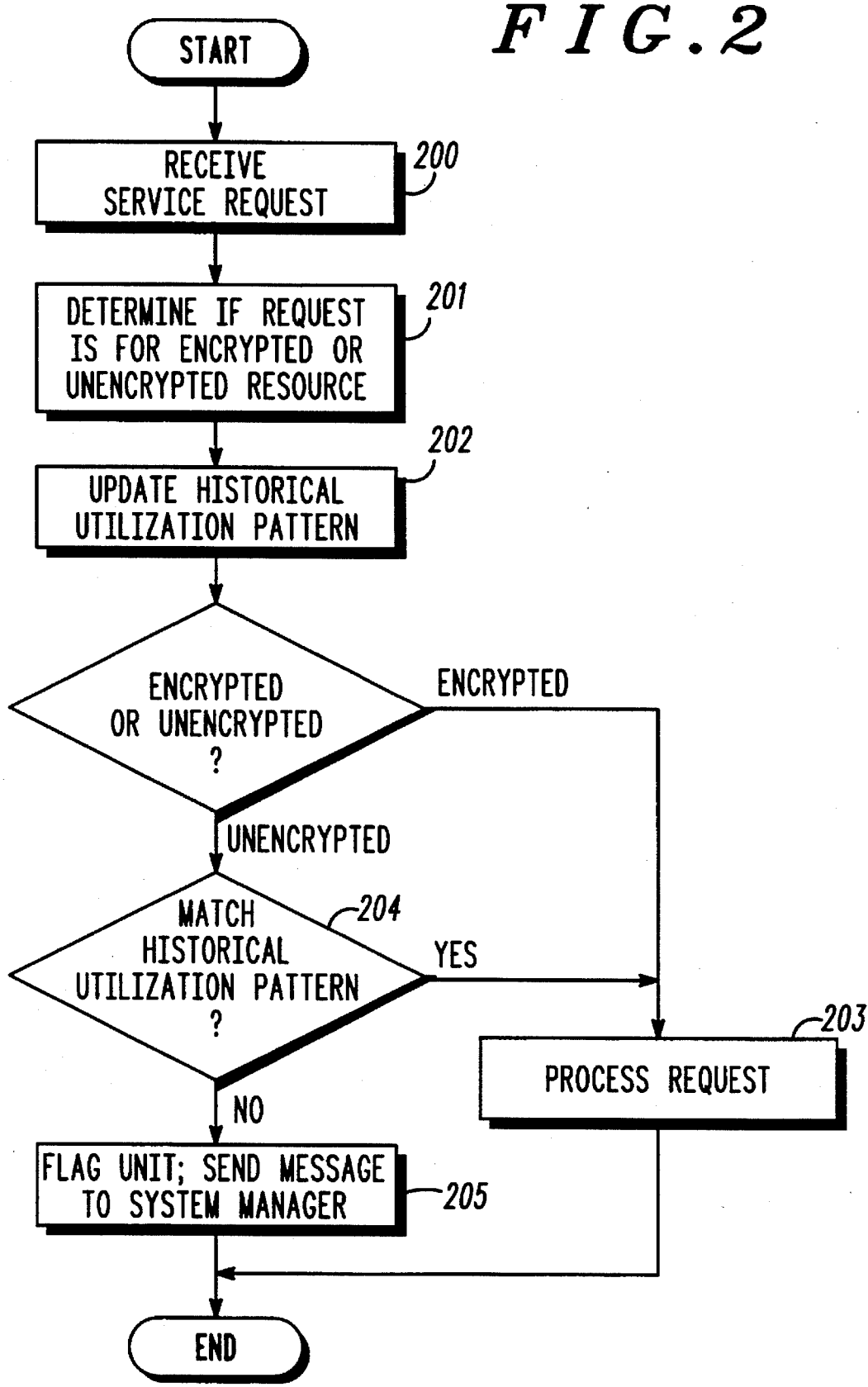

METHOD OF DETECTING UNAUTHORIZED USE OF A COMMUNICATION UNIT IN A SECURE COMMUNICATION SYSTEM

FIELD OF THE INVENTION

This invention generally relates to secure communication systems, including but not limited to a method for detecting unauthorized use of a communication unit in such systems.

BACKGROUND OF THE INVENTION

Communication systems are known to include a central controller, a plurality of communication units, and communication resources. In such systems, the communication resources may be RF frequencies, pairs of RF frequencies, TDM slots, or any medium to carry RF transmissions.

In a secure communication system, communications are transmitted over communication resources in an encrypted manner. A message is typically encrypted using a particular encryption algorithm, or technique, along with an encryption key that adds extra security into secure transmissions. Examples of encryption algorithms include data encryption standard (DES), digital voice protection (DVP), cipher feedback, and open loop feedback. These encryption algorithms are generally used throughout the secure technology arena.

In secure communication systems, a communication unit has the option of utilizing the security of encrypted transmissions, or transmitting in an unencrypted, or clear, mode. Thus, the central controller, or communication resource allocator, must be equipped to process both clear communication requests and encrypted communication requests. Most users of a secure communication system, however, transmit in an encrypted mode.

Because the secure communication system can handle both clear and encrypted communications, it is possible for an unauthorized communication unit to operate on the secure communication system in a clear mode and go undetected. When unauthorized communication units are accessing a communication system, whether a secure or a non-secure system, the efficiency of such systems decreases. Thus, authorized users suffer in slower throughput of their communication requests as a result of unauthorized use of the system.

Present technologies do little to detect unauthorized use of a secure communication system, while a substantial amount of technological effort is placed into ensuring that secure communications remain secure. Therefore, a need exists for a method of detecting unauthorized use of a secure communication system.

BRIEF DESCRIPTION OF THE DRAWINGS

FIG. 2 illustrates a logic diagram that may be used to implement the present invention.

DESCRIPTION OF A PREFERRED EMBODIMENT

Figure 1:
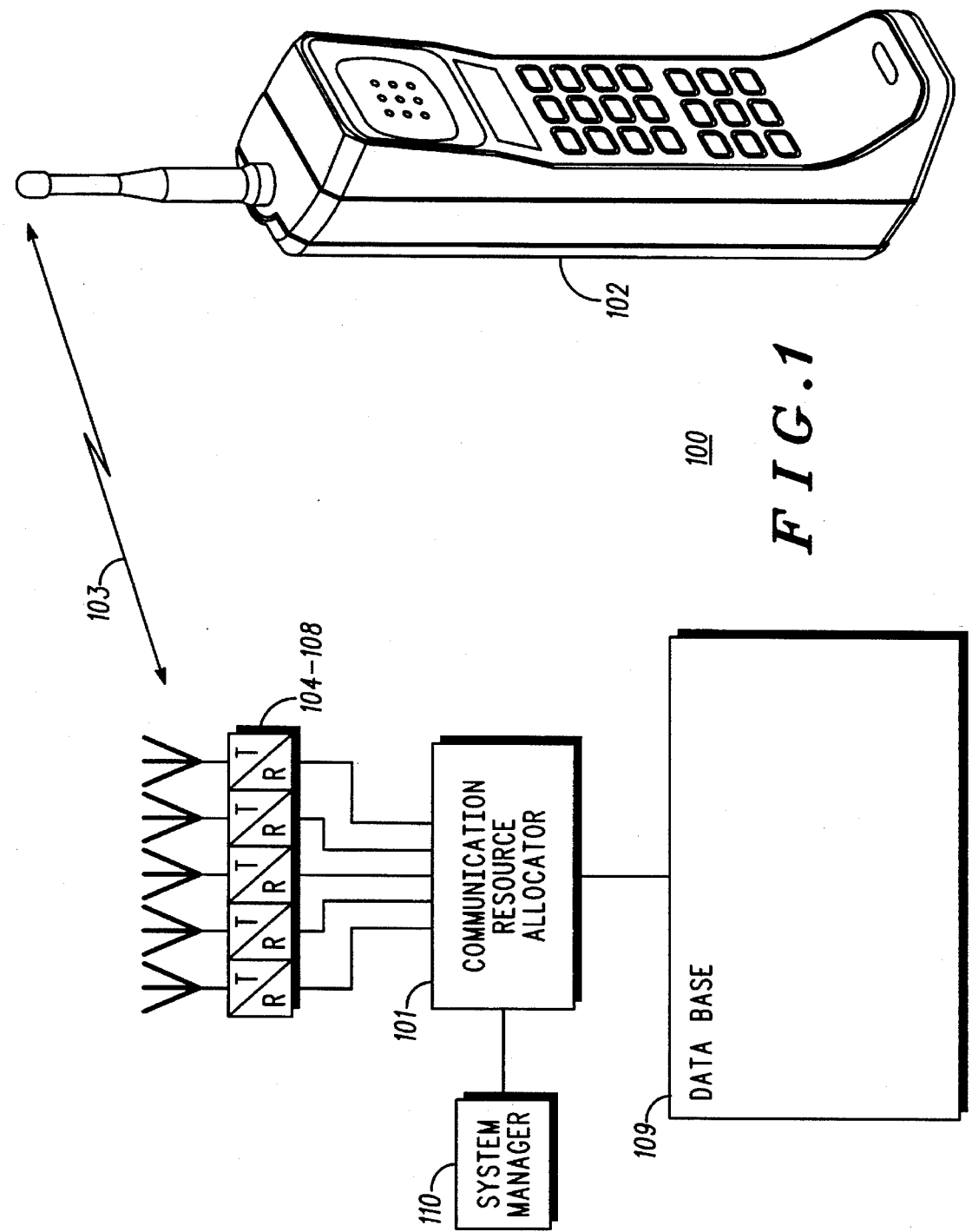
FIG. 1 illustrates a secure communication system that incorporates the present invention.

The following describes an apparatus for and method of detecting unauthorized use of a communication unit in a secure wireless communication system. Service requests are analyzed to determine if an encrypted communication resource or an unencrypted communication resource is requested. A historical utilization pattern is developed for each communication unit, including how often an unencrypted communication resource is requested. When a service request does not substantially match the historical utilization pattern, including when a substantial percentage of requests are for unencrypted communication resources, the communication unit is flagged as a potential unauthorized user.

A method for detecting unauthorized use of a communication unit in a secure wireless communication system includes receiving, by a central controller, a service request from the communication unit via the wireless communication system. The central controller determines whether the service request is requesting an unencrypted communication resource or an encrypted communication resource. When the service request is requesting an unencrypted communication resource, the central controller determines whether the service request substantially matches a historical utilization pattern. When the service request does not substantially match the historical utilization pattern, the central controller indicates that the communication unit is a potential unauthorized communication unit.

An alternative method for detecting unauthorized use of a communication unit in a secure wireless communication system includes receiving, by a central controller, a service request from the communication unit via the wireless communication system. The central controller determines whether the service request is requesting an unencrypted communication resource or an encrypted communication resource. When the service request is requesting an unencrypted communication resource, the central controller determines how many requests for an unencrypted communication resource have been made by the communication unit in a predetermined period of time, yielding a number of requests. When the number of requests is greater than a predetermined threshold, the central controller indicates that the communication unit is a potential unauthorized communication unit.

Additional features include indicating the potential unauthorized communication unit to a system manager. A response is executed from the system manager, the response including sending a message to the potential unauthorized communication unit, which message causes at least a part of the communication unit to self-destruct in five seconds; denying the service request from the potential unauthorized communication unit; and ignoring all future service requests from the potential unauthorized communication unit. The historical utilization pattern may comprise a number of service requests for unencrypted communication resources within at least one predetermined time period, where the at least one predetermined time period may include the hours of daylight and/or the hours of nighttime.

Generally, the present invention provides a method for detecting unauthorized use of the communication unit in a secure wireless communication system. This is accomplished when a central controller receives a service request from a communication unit. Upon receiving the request, the central controller determines whether the request is for an unencrypted communication resource or an encrypted communication resource. When a service request is for an unencrypted communication resource, the central then subsequently determines whether this request matches a historical utilization pattern for this particular communication unit. When the request does not match the historical utilization pattern, the central controller determines that this communication unit is a potential unauthorized communication unit. With such a method, unauthorized use of a secure communication system may be detected and responded to properly, which was not the case with prior art systems.

The present invention can be more fully understood with reference to FIG. 1 and FIG. 2. FIG. 1 illustrates a secure communication system 100 that includes a communication resource allocator (101) (or central controller), a plurality of communication units (102), a plurality of communication resources (103), repeaters (104–108), a database (109), and a system manager (110). In such a system, one of the repeaters (104–108) is designated as a control channel, while the remaining channels are designated as working channels. In operation, a communication unit (102) transmits a service request via a communication resource of the control channel to the central controller (101). Upon receiving the service request, the central controller (101) determines whether the communication unit is authorized to access the system and whether the communication unit has requested a service to which it has subscribed. If both of the previous inquiries are answered affirmatively, the central controller (101) processes the request.

In the secure communication system 100, the communication unit (102) may transmit in its service request in an encrypted mode or in an unencrypted, or clear, mode. When transmitting in the encrypted mode, the communication unit (102) and the central controller (101) must be utilizing the same encryption algorithm and utilizing the same encryption key for correct decryption of communication messages. Establishment of the encryption algorithm and the encryption key is not the scope of this invention and is generally understood in the art, thus no further discussion will be presented regarding these items unless to further enhance the understanding of the present invention. Note that the communication unit may be a Motorola SABER radio, SPECTRA radio, or any other type of radio that transmits in a secure (encrypted) and unsecure (unencrypted) mode. The central controller may be a Motorola Zone Controller, while the system manager may be a Motorola Smartzone Manager and the repeaters (104–108) may be Quantar repeaters.

As is generally understood, users of secure communication systems generally utilize the system in the encrypted mode, i.e., they want to prevent eavesdropping of their communications. Thus, a historical utilization pattern can be generated for a particular communication unit. This utilization pattern is based on the type of service requests that a particular communication unit requests. Thus, it is anticipated that most units will have the relative high historical utilization pattern of encrypted messages making it readily detectable when a particular unit switches from making a majority of its requests in an encrypted mode or requesting encrypted communication resources to requesting a majority or all of the requests in the clear mode. When such a dramatic shift happens, a flag is established indicating that this unit is potentially unauthorized to access the system. Once the flag is set, the central controller could inform the system manager (110) of the unit allowing the system manager to decide how to respond to the unit. In addition, the communication unit may be a stolen unit or a duplicated unit that is not privy to the encryption key information or the encryption algorithm that is currently active in the secure communication system, and thus is only capable of operating in a clear mode.

FIG. 2 illustrates a logic diagram that may be used to implement the present invention. The central controller receives a service request from a particular communication unit (200). Upon receiving this information, the central controller determines whether the request is asking for an unencrypted communication resource or an encrypted communication resource (201). Having determined this, the central controller updates the historical utilization pattern for this particular communication unit in the database (202). With the database updated, the central controller processes the request if the unit has requested an encrypted communication resource (203). For the central controller to process the request, the request must be in proper form, including any required utilization of the present (active) encryption key and the present (active) encryption algorithm. Note that in many secure communication systems, the encryption key, or encryption parameters, vary periodically to enhance the security of the system thus requiring the central controller and the communication units to be aware of the currently utilized or active encryption parameters.

If the request was for an unencrypted communication resource, the central controller determines whether the request substantially matches an historical utilization pattern for this particular communication unit (204). The historical utilization pattern was mentioned above as database entries that record the particular communication unit's utilization of the system. These entries indicate whether unit typically requests encrypted communication resources or typically requests unencrypted communication resources. For example, assume that a particular communication unit requests 95% of its calls to be secure communications. For the last seven calls, the unit has been requesting strictly clear or unencrypted communications. With such a dramatic change, the central controller would flag this particular unit as not matching the historical pattern and identifying this unit as a potentially unauthorized communication unit and sending a message to a system manager (205). If, however, the request substantially matches the historical pattern for the particular unit, the central controller processes the request (203). Substantially matching the historical pattern is determined by a system administrator or other person who determines what type of communication resource allocation is desired for the system. If the system administrator wishes to keep tight control on the system by limiting the number of clear communications by a particular unit before the unit is flagged, the system administrator would require the historical pattern to be matched almost exactly, say with one percent deviation. If a less strict control is desired, the administrator may require the historical pattern to be matched with five to ten percent deviation. A small amount of control may be obtained by requiring the historical pattern to be matched with as little as 25 percent deviation from the pattern.

In an alternative embodiment, when the service request is requesting an unencrypted communication resource, the central controller, determines how many requests the communication unit has made for an unencrypted communication resource in a predetermined period of time. The predetermined period of time is any time period the system administrator deems relevant for a particular system, such as daytime hours or nighttime hours. The time period may also include certain times of the day or week when historically heavy communication traffic occurs on a particular system, such as 2 PM to 4 PM on Monday through Friday. The system administrator predetermines a threshold of the number of communications that will be allowed to be unencrypted for a particular unit during the predetermined time period. The predetermined threshold may be found by taking an average number of requests in the predetermined period of time and allotting percentage of those to be unencrypted, such as two percent during heavy traffic times. When the number of requests is greater than the predetermined threshold, the central controller indicates that the communication unit is a potential unauthorized communication unit. The indication message is sent to the system manager for determination of any subsequent action.

Having sent the flag message to the system manager (205), the central controller determines whether it receives a response from the system manager (206). If a response is not received, the central controller processes the request (203). If, however, a response is received (206), the central controller executes the response (207). The response may be to direct the central controller to disable the communication unit by reprogramming the communication unit such that it is incapable of accessing the system, or by ignoring any request from this particular communication unit. Alternatively, the response may be a message that permanently disables the communication unit by damaging internal workings within the communication units. For example, the message may cause the unit to damage its microprocessor within five seconds of receiving the message, e.g., erasing all of the microprocessor's memory. Yet another alternative, may be to just deny this particular service request from the particular communication unit.

The present invention provides a method for detecting unauthorized use of a communication unit in a secure wireless communication system. With such a method, communication units that have been modified to include unauthorized or duplicated identification codes can now be detected within a secure communication system. In addition, communication units that have been stolen from a police car, FBI car, etc., may be detected and disabled from accessing the communication system. Thus, the authorized users of the secure communication system will have enhanced system access and have greater security in utilizing the system, and also less contention for communication resources.

What is claimed is:

1. A method for detecting unauthorized use of a communication unit in a secure wireless communication system, comprising the steps of:

a) receiving, by a central controller, a service request from the communication unit via the wireless communication system;

b) determining, by the central controller, whether the service request is requesting an unencrypted communication resource or an encrypted communication resource;

c) when the service request is requesting an unencrypted communication resource, determining, by the central controller, whether the service request significantly deviates from a historical utilization pattern; and d) when the service request significantly deviates from the historical utilization pattern, indicating, by the central controller, that the communication unit is a potential unauthorized communication unit.

2. The method of claim 1, wherein the step of indicating further comprises sending an indication of the potential unauthorized communication unit to a system manager.

3. The method of claim 2, further comprising the step of executing a response from the system manager.

4. The method of claim 3, wherein the step of executing further comprises sending a message to the potential unauthorized communication unit, which message causes at least a part of the communication unit to self-destruct in five seconds.

5. The method of claim 3, wherein the step of executing further comprises denying the service request from the potential unauthorized communication unit.

6. The method of claim 3, wherein the step of executing further comprises ignoring all future service requests from the potential unauthorized communication unit.

7. The method of claim 1, wherein the historical utilization pattern comprises a number of service requests for unencrypted communication resources within at least one predetermined time period.

8. The method of claim 7, wherein the at least one predetermined time period includes hours of daylight.

9. The method of claim 7, wherein the at least one predetermined time period includes hours of nighttime.

10. A method for detecting unauthorized use of a communication unit in a secure wireless communication system, comprising the steps of:

a) receiving, by a central controller, a service request from the communication unit via the wireless communication system;

b) determining, by the central controller, whether the service request is requesting an unencrypted communication resource or an encrypted communication resource;

c) when the service request is requesting an unencrypted communication resource, determining, by the central controller, how many requests for an unencrypted communication resource have been made by the communication unit in a predetermined period of time, yielding a number of requests; and d) when the number of requests is greater than a predetermined threshold, indicating, by the central controller, that the communication unit is a potential unauthorized communication unit.

11. The method of claim 10, wherein the step of indicating further comprises sending an indication of the potential unauthorized communication unit to a system manager.

12. The method of claim 11, further comprising the step of executing a response from the system manager.

13. The method of claim 12, wherein the step of executing further comprises sending a message to the potential unauthorized communication unit, which message causes at least a part of the communication unit to self-destruct in five seconds.

14. The method of claim 12, wherein the step of executing further comprises denying the service request from the potential unauthorized communication unit.

15. The method of claim 12, wherein the step of executing further comprises ignoring all future service requests from the potential unauthorized communication unit.

16. The method of claim 10, wherein the predetermined time period includes hours of daylight.

17. The method of claim 10, wherein the predetermined time period includes hours of nighttime.

* * * * *